US007088564B1

(12) United States Patent
Chaudhry

(10) Patent No.: US 7,088,564 B1
(45) Date of Patent: Aug. 8, 2006

(54) GROUNDING MODULE WITH AN AC OUTLET

(75) Inventor: Nisar A. Chaudhry, Huntington Station, NY (US)

(73) Assignee: TII Network Technologies, Inc., Copiague, NY (US)

( * ) Notice: Subject to any disclaimer, the term of this patent is extended or adjusted under 35 U.S.C. 154(b) by 587 days.

(21) Appl. No.: 10/408,065

(22) Filed: Apr. 4, 2003

(51) Int. Cl.
*H02H 3/00* (2006.01)

(52) U.S. Cl. .......................................................... 361/42

(58) Field of Classification Search .................. 361/42
See application file for complete search history.

(56) References Cited

U.S. PATENT DOCUMENTS

| | | | | |
|---|---|---|---|---|
| 5,285,163 | A * | 2/1994 | Liotta | 324/508 |
| 5,625,285 | A * | 4/1997 | Virgilio | 324/133 |
| 6,252,754 | B1 | 6/2001 | Chaudhry | 361/111 |
| 6,323,652 | B1 * | 11/2001 | Collier et al. | 324/508 |

OTHER PUBLICATIONS

U.S. Appl. No. 10/216,367 entitled Power Line Surge Protection Device filed Aug. 9, 2002 to Nisar A. Chaudhry.

* cited by examiner

*Primary Examiner*—Stephen W. Jackson
(74) *Attorney, Agent, or Firm*—Morgan & Finnegan, LLP

(57) ABSTRACT

A grounding module comprising a housing, an AC plug, a female outlet, a ground sensing-circuit for determining whether or not a ground is present when the AC plug is inserted into an AC outlet and an external ground connection for providing the ground to an electrical device.

39 Claims, 8 Drawing Sheets

GROUNDING MODULE WITH AN AC OUTLET

BACKGROUND OF THE INVENTION

1. Field of the Invention

The present invention relates to an apparatus for providing a good ground connection and more particularly, to providing a good ground connection to electronic devices connected to AC power lines, telephone lines and/or networks that carry high-speed digital signals, by employing an AC outlet, a ground-sensing indicator and an external ground connection.

2. Discussion of the Related Art

A typical AC outlet includes a means for connecting to an AC line, AC neutral and ground. Most users of AC outlets insert two and three prong AC plugs (connected to electronic devices) into an AC outlet without knowing whether or not the AC outlet's ground connection is good or bad. In addition, the status of the AC outlet's internal wiring is typically unknown. This uncertainty regarding the status of the ground connection and the AC outlet's internal wiring can be particularly harmful to the electronic device and in some instances to the user. For example, if the user of a computer plugged the computer into an AC outlet with a bad ground (or reversed AC line and AC neutral wiring) and a "hot" wire inside the computer were to come loose, the user would get a potentially fatal shock if they were to touch the metal casing of the computer. In addition, the computer's internal components could be damaged due to the overvoltage condition. However, if the computer was connected to an AC outlet with a good ground (and proper internal AC wiring) and the "hot" wire were to come loose, a fuse would trip in the fuse box causing the device to turn off, thereby a user coming into contact with the computer would not receive a shock and the computer's internal components would remain unharmed.

Similarly, many electronic devices that connect to three prong AC outlets include an additional grounding wire to ensure the safety of the device and user. Examples of such devices include, devices employing two prong AC plugs (because they do not have a ground connection) and high priced electronic equipment and appliances (which desire the redundancy due to their costs). However, in order to connect the grounding wire to a ground the user must remove the AC outlet's cover plate and manually connect the grounding wire to the grounding means of the AC outlet. This process can be very cumbersome and fraught with the same potential dangers as discussed above because the user may not be aware of the status of the AC outlet's ground connection.

Thus, there is a need for an apparatus that provides electronic devices with a reliable ground, AC line and AC neutral connection and an external ground connection at relatively inexpensive cost.

SUMMARY OF THE INVENTION

The present invention overcomes the foregoing and other problems encountered in the known teachings by providing a grounding module comprising a housing, an AC plug, a female outlet, a ground sensing-circuit for determining whether or not a ground is present and an external ground connection for providing the ground to an electrical device and which meets the stringent requirements of Underwriters Laboratories Standard 498A dated Dec. 17, 1999. Advantageously, the grounding module indicates both the presence or absence of a ground connection via light emitting diodes, thereby, alleviating the risks associated with connecting to an AC outlet possessing a bad ground. Further, the grounding module includes an external ground connection for enabling simple and safe connection of grounding wires associated with electrical devices. In addition, the grounding module includes a female outlet for providing an auxiliary AC receptacle.

In one embodiment of the present invention, a grounding module comprises: a housing; an AC plug, the plug having a first conductor for connection to an AC line, a second conductor for connection to an AC neutral and a third conductor for connection to a ground; at least one female outlet, the outlet comprising a first, a second, and a third conductor connected, respectively, to the first, the second and the third conductors of the AC plug; a ground-sensing circuit disposed within the housing and connected to the AC line, the AC neutral and the ground for determining whether or not the ground is present when the AC plug is inserted into an AC outlet; and at least one external ground connection connected to the ground for providing the ground to an electrical device.

In another embodiment of the present invention, a grounding module comprises: a housing; an AC plug, the plug having a first conductor for connection to an AC line, a second conductor for connection to an AC neutral and a third conductor for connection to a ground; at least one female outlet, the outlet comprising a first, a second, and a third conductor connected, respectively, to the first, the second and the third conductors of the AC plug; a ground/potential difference-sensing circuit disposed within the housing and connected to the AC line, the AC neutral and the ground for determining whether or not the ground is present and for determining whether or not there is a wiring problem in an AC outlet, when the AC plug is inserted into the AC outlet; at least one external ground connection connected to the ground for providing the ground to an electrical device; and at least one coaxial connector connected to the ground for providing the ground to a device comprising a coaxial cable.

In yet another embodiment of the present invention, a user plugs a grounding module into an AC outlet and attaches a grounding wire that is connected to an electrical device to an external ground connection on the grounding module, wherein the grounding module indicates the presence or absence of a ground connection.

In another embodiment of the present invention, a user plugs a grounding module into an AC outlet and attaches a coaxial cable that is connected to an electrical device to a coaxial connector on the grounding module, wherein the grounding module indicates the presence or absence of a wiring problem with the AC outlet.

The above advantages and features are of representative embodiments only, and are presented only to assist in understanding the invention. It should be understood that they are not to be considered limitations on the invention as defined by the claims, or limitations on equivalents to the claims. For instance, some of these advantages may seem mutually contradictory, in that they cannot be simultaneously implemented in a single embodiment. Similarly, some advantages are primarily applicable to one aspect of the invention. Thus, this summary of features and advantages should not be considered dispositive in determining equivalence. Additional features and advantages of the invention will become apparent in the following description, from the drawings, and from the claims.

DESCRIPTION OF THE PREFERRED EMBODIMENTS

In the following description of the various embodiments, reference is made to the accompanying drawings which form a part hereof, and which show by way of illustration various embodiments in which the invention may be practiced. It is to be understood that other embodiments may be utilized and structural and functional modifications may be made without departing from the scope of the present invention.

Figure 1:
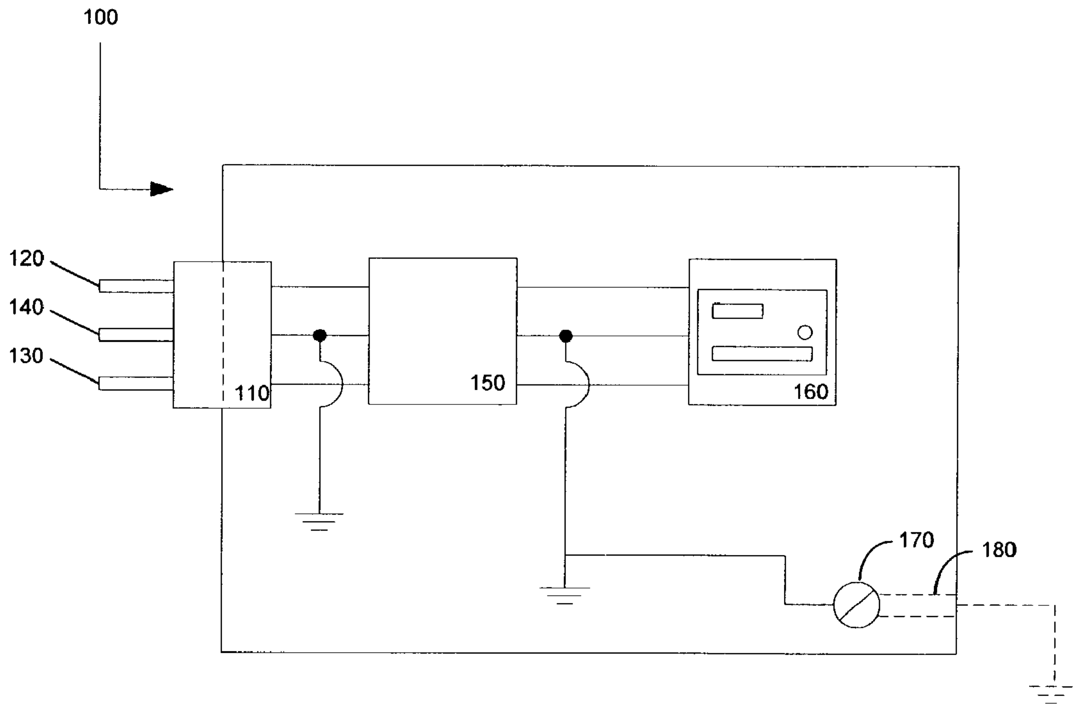
FIG. 1 is a schematic block diagram of a grounding module in accordance with the present invention.
Figure 3:
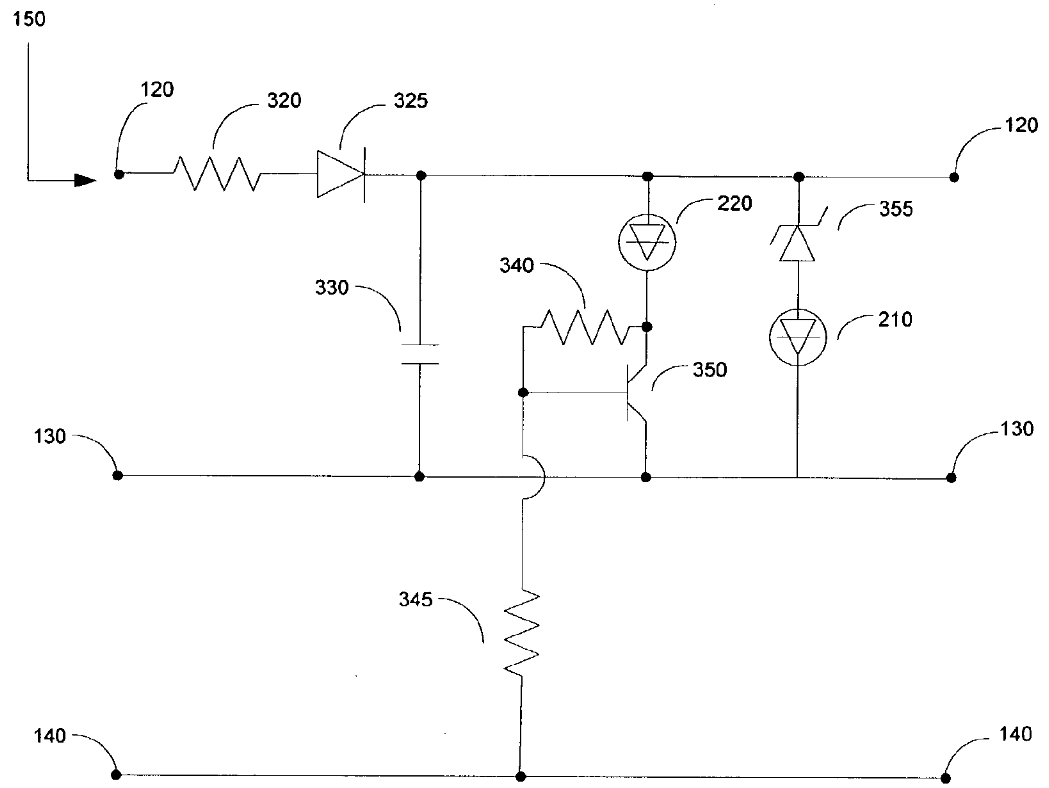
FIG. 3 is a schematic diagram of a ground-sensing indicator circuit for use with the present invention.

FIG. 1 is a schematic block diagram of a grounding module 100 in accordance with the present invention. As shown in FIG. 1, grounding module 100 comprises a three-prong male AC plug 110 which is adapted to plug into an AC outlet. In this embodiment the AC plug 110 is disposed within the housing of the grounding module 100. In an alternative embodiment, however, the AC plug 110 may connected to the grounding module 100 via a power chord connected to the grounding module 100. It should be noted that the power chord may be fixed to the grounding module 100 or removable by plugging a female end thereof into male conductors positioned in or projecting from the grounding module 100. As shown in FIG. 1, grounding module 100 has three conductors: AC power line or AC line 120, AC neutral 130 and ground 140. Grounding module 100 also contains a ground-sensing indicator circuit 150 and a female outlet 160. The female outlet 160 contains a first, second and third conductor for connecting to the first, second and third conductors, respectively, of the AC plug 110. Ground-sensing indicator circuit 150 which may take the form of the circuit shown in FIG. 3 is described later. Grounding module 100 additionally contains an external ground connection in the form of a screw 170 and a passage 180, which communicates with screw 170 and receives an external ground wire.

Figure 2:
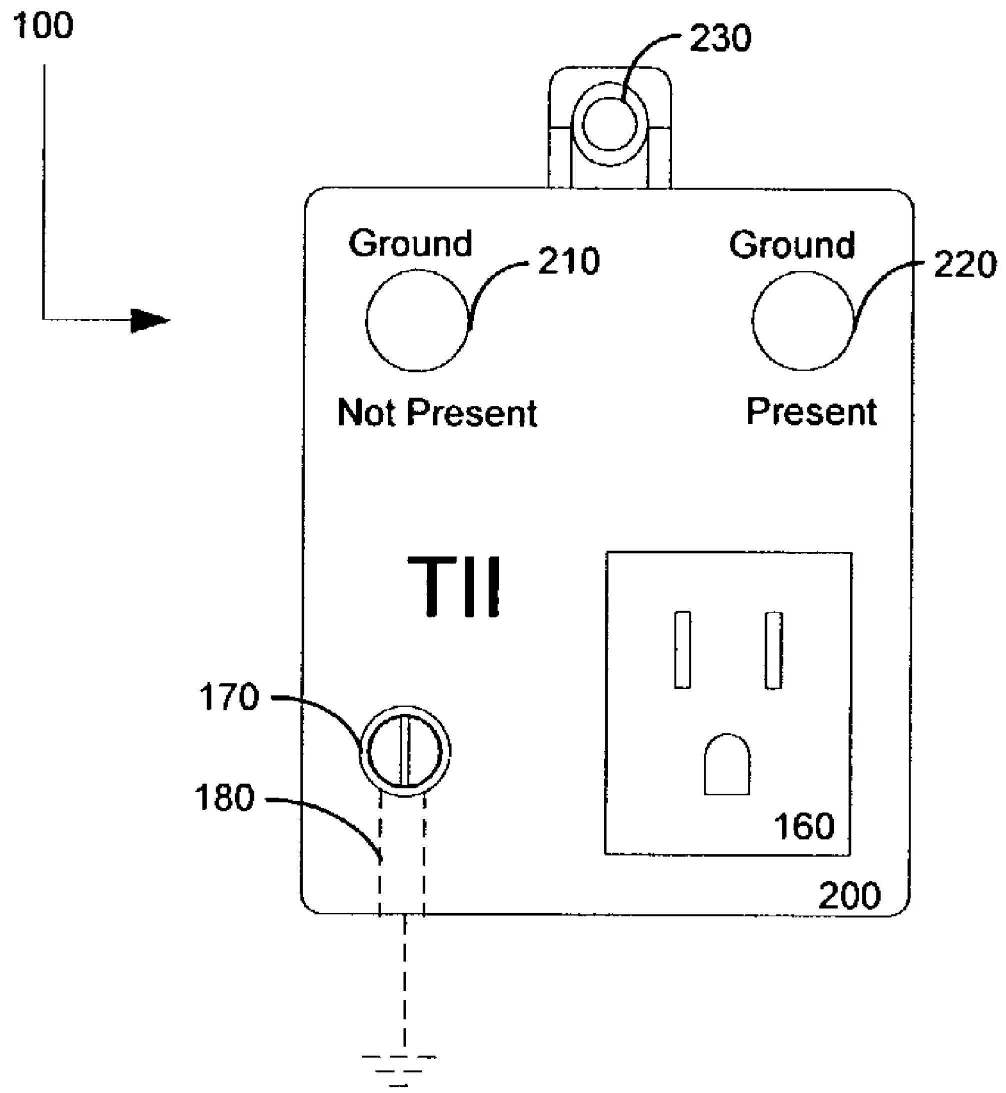
FIG. 2 is a front view the grounding module in accordance with the present invention.

FIG. 2 is a front view of the grounding module 100 in accordance with the present invention. As shown in FIG. 2, grounding module 100 comprises the female outlet 160, external ground connection in the form of screw 170 and passage 180. Grounding module 100 also contains two light emitting diodes (LEDs) 210 and 220, an opening 230 and an insulated housing 200. Screw 170 provides the ground 140 to electrical devices that employ a grounding wire. Such devices may be for example, dishwashing machines, refrigerators, clothes washers, computers, telecommunications test equipment or the like. In order to provide the ground 140 to an electrical device via screw 170, a user inserts the grounding wire into the passage 180, which communicates with screw 170. The grounding wire is then secured by tightening screw 170. In an alternative embodiment the grounding wire may be secured into the passage 180 by another fastener such as a nut, clamp, latch or the like. It should also be noted that passage 180 may extend from the grounding module 100 to enable a user to insert a grounding wire into it more easily.

As further shown in FIG. 2, the LEDs 210 and 220 are connected to the ground-sensing indicator circuit 150 (not shown) which will be discussed in detail hereinafter in connection with FIG. 3. LEDs 210 and 220 indicate whether or not the ground 140 is present when the grounding module 100 is inserted into an AC outlet. For example, LED 210 indicates that a ground is not present or that there may be a problem in relation to the wiring associated with the AC outlet to which the grounding module 100 is plugged into. In addition, LED 220 indicates that a ground is present when the grounding module 100 is plugged into an AC outlet. Both LEDs 210 and 220 may also indicate that there is a possible problem in relation to the wiring associated with the AC outlet to which the grounding module 100 is plugged into when they are illuminated at the same time. LEDs 210 and 220 are colored red and green, respectively, although any appropriate color LED may be used such as green, white, yellow or the like. Moreover, LEDs 210 and 220 may be used interchangeably thereby allowing for LED 220 to be in LED 210's location and LED 210 to be in LED 220's location. As further shown in FIG. 2, the opening 230 is provided to enable a user to secure the grounding module 100 to a wall or some other receptacle by using for example, a screw or nail to prevent the grounding module 100 from falling out of the AC outlet to which it is plugged into.

FIG. 3 is a schematic diagram of a ground-sensing indicator circuit for use with the present invention. As shown in FIG. 3, circuit 150 is connected to: AC line 120, AC neutral 130 and ground 140. Circuit 150 includes a resistor 320 connected in series with AC line 120, and a resistor 345, which is connected in series with the ground 140. As shown in FIG. 3, diode 325 is connected in series with resistor 320 and with capacitor 330. Circuit 150 also includes a transistor 350 which has a base, an emitter, and a collector. The emitter of transistor 350 is connected to LED 220 and to a resistor 340, the base is connected to the resistors 340 and 345, and the collector is connected to AC neutral 130. Circuit 150 additionally includes capacitor 330 connected to AC line 120 and AC neutral 130. In parallel with capacitor 330 is a zener diode 355, which is connected to AC line 120. LED 210 is connected in series with zener diode 355 and AC neutral 130.

Resistors 320 and 340 may be 10 kilo-ohm, 3 watt resistors and resistor 345 may be a 330–600 kilo-ohm, ¼ watt resistor. Diode 325 may be type IN4007, 1 amp, 1000 volt PIV diode. Zener diode 355 may be type IN4762, 82 volt, 1 watt diode. Capacitor 330 may be a 0.22 micro-farads, 250 volt capacitor made by PANASONIC and sold under part number ECQ-E2224KF. LED 220 may be type 5400A5 and LED 210 may be type 5400A1. Transistor 350 may be type MPSA92, PNP high-voltage transistor.

When the grounding module 100 is plugged into an AC outlet the circuit 150 monitors the presence of a ground connection continuously. If the ground connection is lost circuit 150 alerts a user by illuminating LED 210 (i.e., indicating a negative presence of the ground connection). In contrast, if the ground connection is present circuit 150 alerts a user by illuminating LED 220 (i.e., indicating a positive presence of the ground connection). In turn, this enables a user to have a sufficient level of confidence that the ground connection is present. In addition, if the circuit 150 detects a wiring problem associated with the AC outlet, LEDs 210 and 220 will be lit at the same time. Thus, offering an additional means determining whether or not the ground connection is good.

Figure 4:
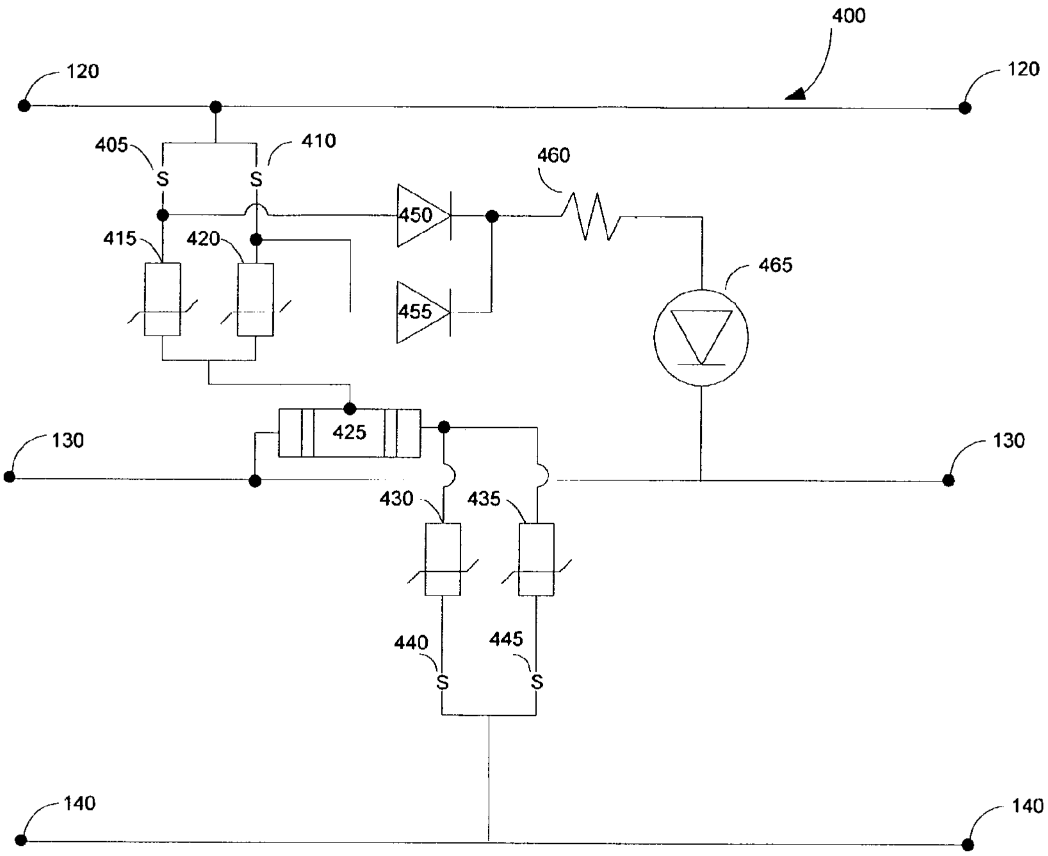
FIG. 4 is a schematic diagram of an AC overvoltage protection circuit with an operating indicator for use with the present invention.

In an alternative embodiment circuit 150 may be the ground-sensing indicator circuit described in FIG. 4 of U.S. patent application Ser. No. 10/216,367 to Nisar A. Chaudhry filed on Aug. 9, 2002, which is incorporated herein by reference.

FIG. 4 is a schematic diagram of an AC overvoltage protection circuit with an operating indicator for use with the present invention. Circuit 400 may be connected directly to the ground-sensing indicator circuit 150 to offer the additional benefit of AC overvoltage protection. Circuit 400 employs thermal fuses 405 and 410 connected in series with AC line 120 and thermal fuses 440 and 445 connected in series with ground 140. Suitable thermal fuses are available as Microtemp Thermal Cutoffs made by Thermodisc, Incorporated, 1320 South Main Street, Mansfield, Ohio, 44907–0538 under part number RVLU 84C. Fuses 405, 410, 440, and 445 will fuse open when excessive heat is generated within a module housing the AC overvoltage protection circuit 400. Metal Oxide Varistors (MOVs) 415 and 420 are connected between AC line 120 and one electrode of gas tube 425. MOVs 430 and 435 are connected between AC neutral 130 and one electrode of gas tube 425. MOVs 415, 420, 430, and 435 may be a 95 volt device which is available from Maida Development Company, under part number D6521Z0950RA65. Gas tube 425 may be an TII 11B gas tube which is available from TII Industries, Inc., Copiague, N.Y. and has a breakdown voltage in the range of 300 to 500 volts. Fuses 405, 410, 440, and 445 are located in close physical proximity to the MOVs 415, 420, 430, and 435 and the gas tube 425.

Circuit 400 also includes a diode 450 connected between thermal fuse 405 and MOV 415. In parallel with diode 450 is a diode 455, which is connected between thermal fuse 410 and MOV 420. Diodes 450 and 455 may be type IN4007, 1 amp, 1000 volt PIV diodes. Connected in series to diodes 450 and 455 is resistor 460, which may be a 10 kilo-ohm, 3 watt resistor. Connected to resistor 460 in series is an LED 465, which may be type 5400A5. In operation LED 465 is illuminated to indicate to a user that circuit 400 is operating properly. Thus, if LED 465 is not illuminated circuit 400 is not operating properly. It is to be understood that LED 465 may located anywhere on the grounding module 100, however, it should be located away from LEDs 210 and 220 (discussed in reference to FIG. 2) so that a user of the grounding module 100 would not become confused between the ground-sensing LEDs and LED 465.

Circuit 400 as shown in FIG. 4 has been tested and meets the requirements of UL 1449 Ed 2. The MOVs 415 and 420 between AC line 120 and gas tube 425 and the MOVs 430 and 435 between ground 140 and the gas tube 425 ensure that the gas tube 425 will turn off after a voltage surge has caused the gas tube 425 to turn on. Also, the fact that gas tube 425 is in series with MOVs 415, 420, 430, and 435 connected to ground 140 and AC line 120 ensures that there will be only a very small leakage current through MOVs 415, 420, 430, 435 in the absence of a voltage surge sufficient to cause the gas tube 425 to conduct. In another embodiment that meets the requirements of UL 1449 Ed 2, the gas tube 425 may be removed from the circuit shown in FIG. 4 and the MOVs 415, 420, 430 and 435 may be connected to AC neutral 130.

Figure 6:
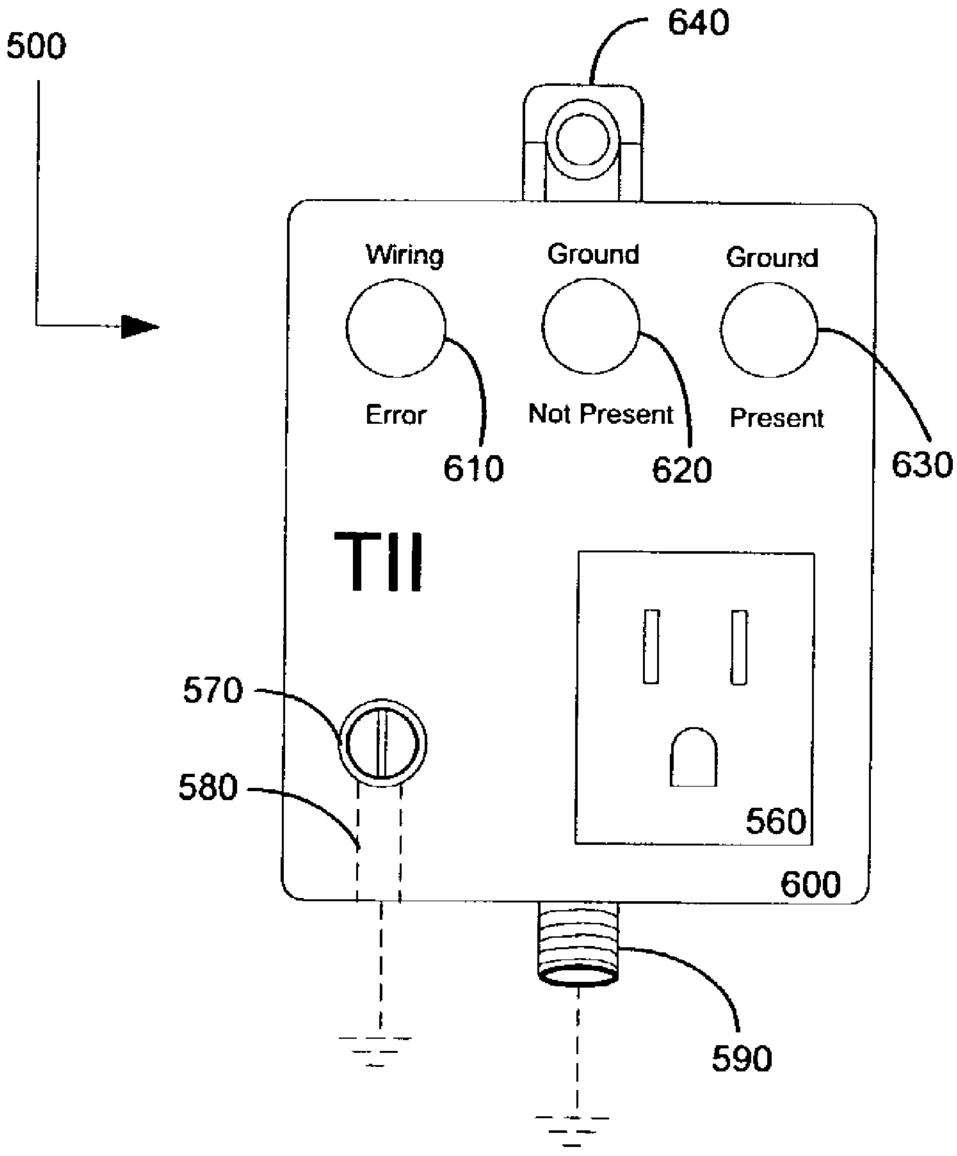
FIG. 6 is a front view of the alternative grounding module in accordance with the present invention.
Figure 7:
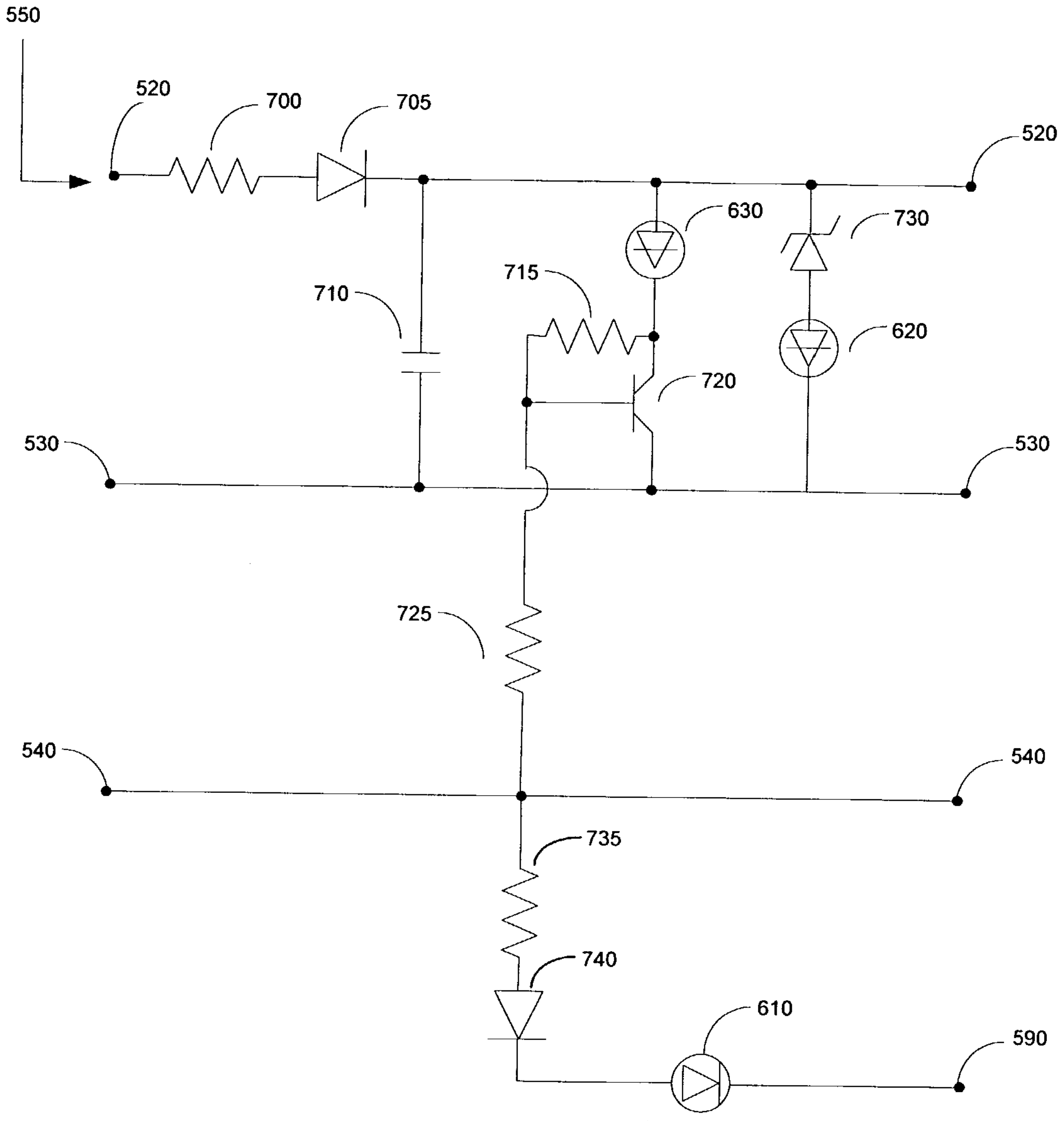
FIG. 7 is a schematic diagram of a ground/potential difference-sensing indicator circuit.
Figure 8:
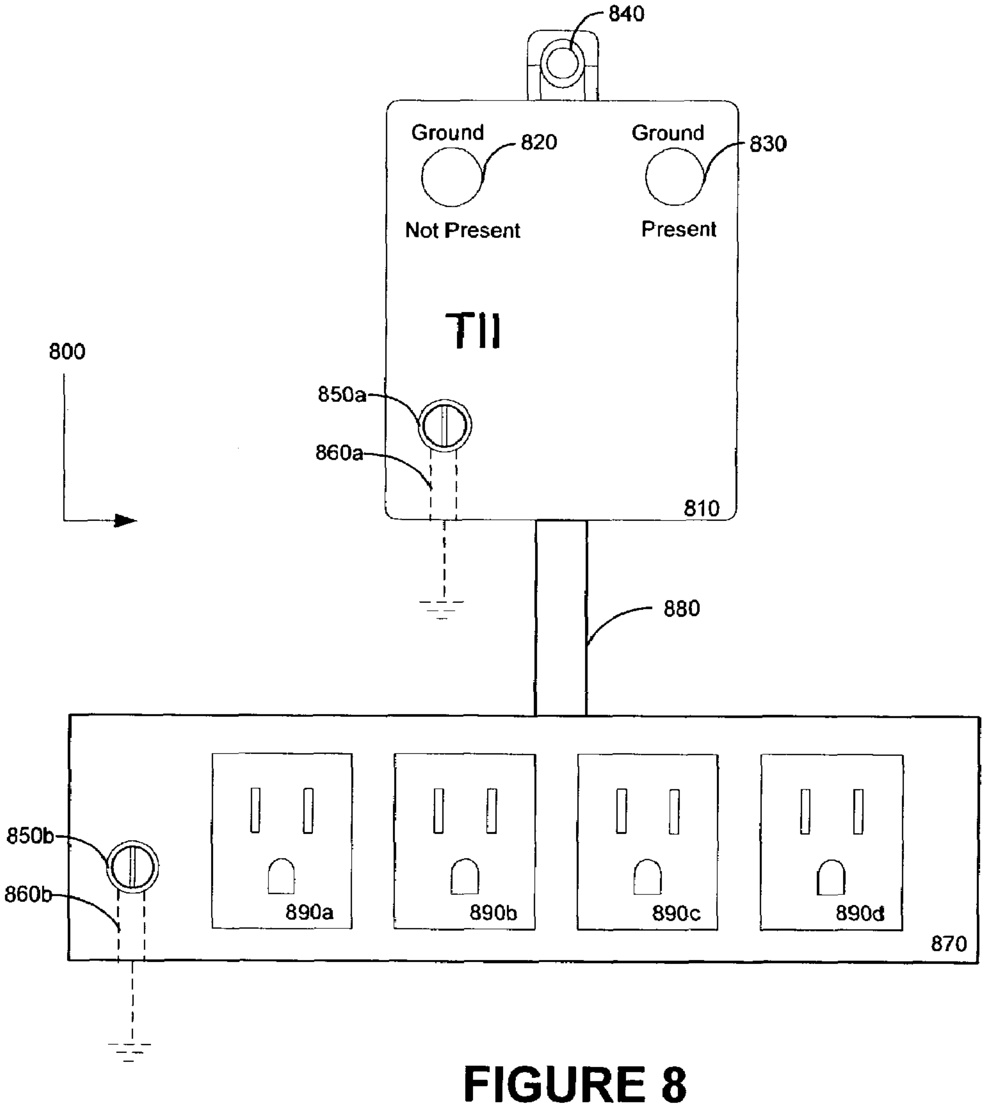
FIG. 8 is a front view of another grounding module in accordance with the present invention.

In an alternative embodiment circuit 400 may be one of the AC protection circuits described in FIGS. 6–8 of U.S. Pat. No. 6,252,754 issued to Nisar A. Chaudhry on Jun. 26, 2001, which are incorporated herein by reference.

Figure 5:
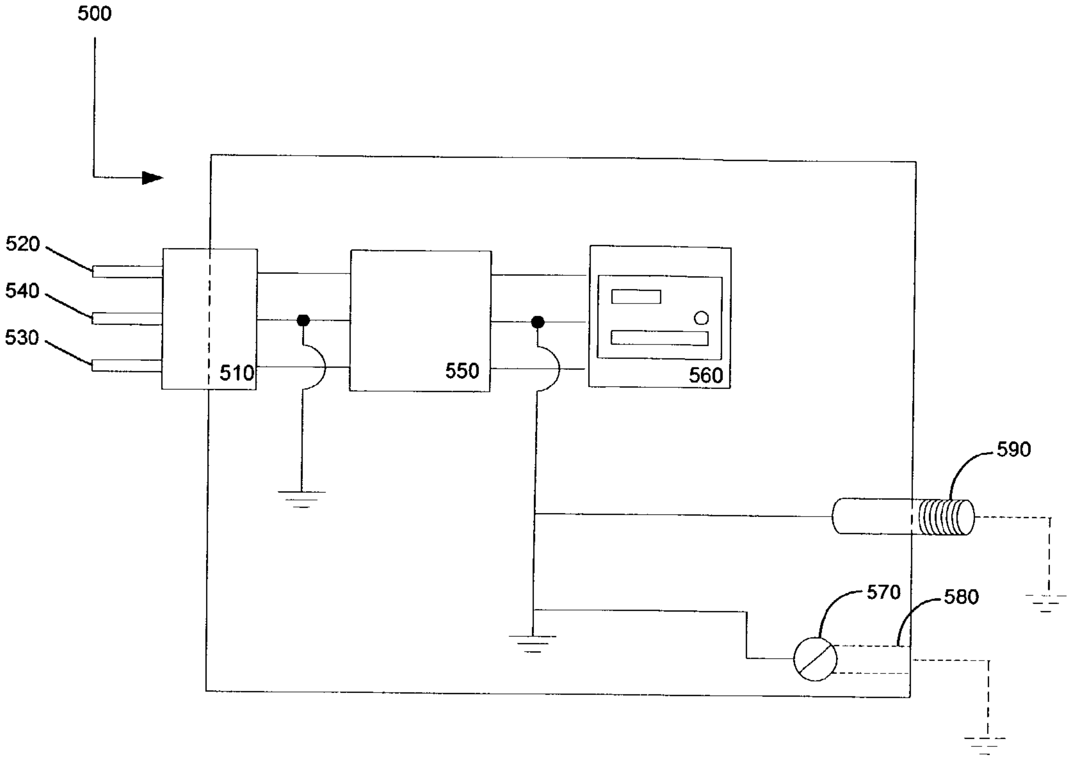
FIG. 5 is a schematic block diagram of an alternative grounding module in accordance with the present invention.

FIG. 5 is a schematic block diagram of an alternative grounding module in accordance with the present invention. As shown in FIG. 5, a grounding module 500 comprises a three-prong male AC plug 510 which is adapted to plug into an AC outlet. In this embodiment the AC plug 510 is disposed within the housing of the grounding module 500. In an alternative embodiment, however, the AC plug 510 may connected to the grounding module 500 via a power chord connected to the grounding module 500. It should be noted that the power chord may be fixed to the grounding module 500 or removable by plugging a female end thereof into male conductors positioned in or projecting from the grounding module 500. As shown in FIG. 1, grounding module 500 has three conductors: AC power line or AC line 520, AC neutral 530 and ground 540. Grounding module 500 also contains a ground/potential difference-sensing indicator circuit 550 and a female outlet 560. The female outlet 560 contains a first, second and third conductor for connecting to the first, second and third conductors, respectively, of the AC plug 510. Ground/potential difference-sensing indicator circuit 550 which make take the form of the circuit shown in FIG. 7 is described later. Grounding module 500 additionally contains an external ground connection in the form of a screw 570 and a passage 580, which communicates with screw 570 and receives and external ground wire. Grounding module 500 also contains an additional ground connection in the form of a female F-type coaxial connector 590.

FIG. 6 is a front view of grounding module 500 in accordance with the present invention. As shown in FIG. 6, grounding module 500 comprises the female outlet 560, and external ground connections in the form of a screw 570, passage 580 and female F-type coaxial connector 590. Grounding module 500 also contains three LEDs 610, 620 and 630, an opening 640 and an insulated housing 600. Screw 570 provides the ground 540 to electrical devices that employ a grounding wire. Such devices may be for example, dishwashing machines, refrigerators, computers, telecommunications test equipment or the like. In order to provide the ground 540 to an electrical device via screw 570, a user inserts the grounding wire into passage 580, which communicates with screw 570. The grounding wire is then secured by tightening screw 570. In an alternative embodiment the grounding wire may be secured into the passage 580 by another fastener such as a nut, clamp, latch or the like. It should also be noted that passage 580 may extend from the grounding module 500 to enable a user to insert a grounding wire into it more easily. The female F-type coaxial connector 590 also provides a ground connection to devices that employ coaxial cables and coaxial connecting means. Such devices may be for example, cable modems, televisions, set-top boxes, digital video disks (DVDs), stereo equipment, computers, telecommunications test equipment or the like.

As further shown in FIG. 6, the LEDs 610, 620 and 630 are connected to ground/potential difference-sensing indicator circuit 550 (not shown) which will be discussed in detail hereinafter in connection with FIG. 7. LEDs 620 and 630 indicate whether or not the ground 540 is present when the grounding module 500 is inserted into an AC outlet. For example, LED 620 indicates that a ground is not present or that there may be a problem in relation to the wiring associated with the AC outlet to which the grounding module 500 is plugged into. In addition, LED 630 indicates that a ground is present when the grounding module 500 is plugged into an AC outlet. Both LEDs 620 and 630 may also indicate that there is a possible problem in relation to the wiring associated with the AC outlet to which the grounding module is plugged into when they are illuminated at the same time. LED 610 indicates if there is a problem with the wiring of the AC outlet to which the grounding module 500 is connected. This is accomplished by connecting a coaxial cable to the female F-type coaxial connector 590. If there is a dangerous potential difference (resulting from reversed AC line and AC neutral wiring) between ground 540 and the coaxial cable connected to female F-type coaxial connector 590, LED 610 will illuminate (i.e. indicating a problem with the wiring of the AC outlet). LEDs 610, 620 and 630 are colored green, red and green, respectively, although any appropriate color LED may be used such as green, white, yellow or the like. Moreover, LEDs 610, 620 and 630 may be used interchangeably. As further shown in FIG. 6, the opening 640 is provided to enable a user to secure the grounding module 500 to a wall or some other receptacle by using for example, a screw or nail to prevent the grounding module 500 from falling out of the AC outlet to which it is plugged into.

FIG. 7 is a schematic diagram of a ground/potential difference-sensing indicator circuit 550 for use with the present invention. As shown in FIG. 7, circuit 550 is connected to: AC line 520, AC neutral 530 and ground 540. Circuit 550 includes a resistor 700 connected in series with AC line 520, and a resistor 725, which is connected in series with the ground 540. As shown in FIG. 7, diode 705 is connected in series with resistor 700 and with capacitor 710. Circuit 550 also includes a transistor 720 which has a base, an emitter and a collector. The emitter of transistor 720 is connected to LED 630 and to a resistor 715, the base is connected to the resistors 715 and 725, and the collector is connected to AC neutral 530. Circuit 550 additionally includes capacitor 710 connected to AC line 520 and AC neutral 530. In parallel with capacitor 710 is a zener diode 730, which is connected to AC line 520. LED 620 is connected in series with zener diode 730 and AC neutral 530. Circuit 550 further includes a resistor 735 connected in series to ground 540, and an LED 610, which is connected to a female F-type coaxial connector 590. As shown, in FIG. 7 a diode 740 is connected in series with resistor 735 and LED 610. In an alternative embodiment, diode 740 may be removed from circuit 550.

Resistors 700 and 715 may be 10 kilo-ohm, 3 watt resistors, resistor 725 may be a 330–600 kilo-ohm, ¼ watt resistor and resistor 735 may be a 47 kilo-ohm, ¼ watt resistor. Diodes 705 and 740 may be type IN4007, 1 amp, 1000 volt PIV diodes. Zener diode 730 may be type IN4764, 82 volt, 1 watt diode. Capacitor 710 may be a 0.22 microfarad, 250 volt capacitor made by PANASONIC and sold under part number ECQ-E2224KF. LEDs 610 and 620 may be type 5400A1 and LED 630 may be type 5400A5. Transistor 720 may be type MPSA92, PNP high-voltage transistor.

When the grounding module 500 is plugged into an AC outlet the circuit 550 monitors the presence of a ground connection continuously. Thus, if the ground connection is lost circuit 550 alerts a user by illuminating LED 620. If the ground connection is present circuit 550 alerts a user by illuminating LED 630. In turn, this enables a user to have a sufficient level of confidence that a good ground connection is present. Further, if a wiring problem is associated with the AC outlet both LEDs 620 and 630 may be illuminated at the same time. Thus, providing an additional means for determining whether or not the ground connection is good. In addition, if there is a wiring problem in the AC outlet to which the grounding module 500 is connected LED 610 is illuminated when a coaxial cable is connected to the female F-type coaxial connector 590. As a result, a user will have a means for determining whether or not a dangerous potential difference exists (resulting, for example, from reversed AC line and AC neutral wiring) between ground 540 and the coaxial cable connected to female F-type coaxial connector 590.

FIG. 8 is a front view of another grounding module in accordance with the present invention. As shown in FIG. 8, the grounding module 800 comprises a first housing 810 and a second housing 870 connected via a power chord 880. The first housing 810 comprises an external ground connection in the form of a screw 850*a* and a passage 860*a*. First housing 810 also contains two LEDs 820 and 830 and an opening 840. The second housing 870 comprises an external ground connection in the form of a screw 850*b* and a passage 860*b*. Second housing 870 also contains several female outlets 890*a–d*. In another embodiment a female outlet may be included in the first housing 810. Screws 850*a–b* provide a ground to electrical devices that employ a grounding wire. Such devices may be for example, dishwashing machines, refrigerators, clothes washers, computers, telecommunications test equipment or the like. In order to provide a ground to an electrical device via screws 850*a–b*, a user inserts the grounding wire into one or both passages 860*a–b*, which communicate with screws 850*a–b*, respectively. The grounding wire is then secured by tightening screws 850*a–b*. In an alternative embodiment the grounding wire may be secured into passages 860*a–b* by another fastener such as a nut, clamp, latch or the like. It should also be noted that passages 860*a–b* may extend from the grounding module 800 to enable a user to insert a grounding wire into them more easily.

As further shown in FIG. 8, the LEDs 820 and 830 are connected to the ground-sensing indicator circuit 150 (not shown) which was discussed in detail in connection with FIG. 3. LEDs 820 and 830 indicate whether or not a ground is present when the grounding module 800 is inserted into an AC outlet. For example, LED 820 indicates that a ground is not present or that there may be a problem in relation to the wiring associated with the AC outlet to which the grounding module 800 is plugged into. In addition, LED 830 indicates that a ground is present when the grounding module 800 is plugged into an AC outlet. Both LEDs 820 and 830 may also indicate that there is a possible problem in relation to the wiring associated with the AC outlet to which the grounding module 800 is plugged into when they are illuminated at the same time. LEDs 820 and 830 are colored red and green, respectively, although any appropriate color LED may be used such as green, white, yellow or the like. Moreover, LEDs 820 and 830 may be used interchangeably. Although not shown in FIG. 8 another set of LEDs may be located on second housing 870. In addition, a ground-sensing indicator circuit (not shown and which was discussed in detail in connection with FIG. 3) may be included in the second housing 870. As further shown in FIG. 8, the opening 840 is provided to enable a user to secure the grounding module 800 to a wall or some other receptacle by using for example, a screw or nail to prevent the grounding module 800 from falling out of the AC outlet to which it is plugged into.

In other embodiments, a plurality of female outlets may be employed by the grounding modules.

In yet another embodiment, a plurality of ground receptacles and screws may be employed by the grounding modules.

It should be understood that the above description is only representative of illustrative embodiments. For the convenience of the reader, the above description has focused on a representative sample of possible embodiments, a sample that is illustrative of the principles of the present invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. Other applications and embodiments can be conceived by those without departing from the spirit and scope of the present invention. It is therefore intended, that the invention is not to be limited to the disclosed embodiments but is to be defined in accordance with the claims that follow. It can be appreciated that many of those undescribed embodiments are within the scope of the following claims, and others are equivalent.

What is claimed is:

1. A grounding module, comprising:

(a) a housing;

(b) an AC plug, the plug having a first conductor for connection to an AC line, a second conductor for connection to an AC neutral and a third conductor for connection to a ground;

(c) at least one female outlet, the outlet comprising a first, a second, and a third conductor connected, respectively, to the first, the second and the third conductors of the AC plug;

(d) a ground-sensing circuit disposed within the housing and connected to the AC line, the AC neutral and the ground for determining whether or not the ground is present when the AC plug is inserted into an AC outlet; and (e) at least one external ground connection connected to the ground for providing the ground to an electrical device.

2. The grounding module of claim 1, further comprising:

a first light emitting diode (LED) for indicating the presence of the ground.

3. The grounding module of claim 1, further comprising:

a second LED for indicating the absence of the ground.

4. The grounding module according to claim 2 or 3, wherein the first and second LEDs indicate a wiring problem when they are simultaneously illuminated.

5. The grounding module of claim 1, wherein the ground-sensing circuit comprises: (1) a first resistor connected in series with the AC line; (2) a diode connected in series with the first resistor; (3) a capacitor, one side of the capacitor being connected to the AC line, the other being connected to the AC neutral; (4) a transistor including a base, an emitter, and a collector, the collector being connected to the AC neutral; (5) a first LED, one side of the LED being connected to the AC line, and the other side being connected to the base of the transistor; (6) a second resistor, one side being connected to the emitter of the transistor, the other being connected to the base of the transistor; (7) a third resistor, one side being connected to the base of the transistor, the other being connected to the ground; (8) a zener diode connected to the AC line; and (9) a second LED, one side being connected to the zener diode, and the other side being connected to the AC neutral.

6. The grounding module of claim 1, wherein the external ground connection comprises a screw for securing a grounding wire from an electrical device to the grounding module.

7. The grounding module of claim 1, wherein the external ground connection comprises a nut, clamp, latch or the like for securing a grounding wire from an electrical device to the grounding module.

8. The grounding module of claim 1, further comprising:

an AC overvoltage protection circuit for protecting against overvoltage conditions appearing on the AC line.

9. The grounding module of claim 8, further comprising:

a third LED for indicating whether or not an AC overvoltage condition exists.

10. The grounding module according to claim 1, wherein the AC plug is disposed within the housing.

11. The grounding module according to claim 1, wherein the AC plug is connected to the grounding module via a power chord.

12. A grounding module, comprising:

(a) a housing;

(b) an AC plug disposed within the housing, the plug having a first conductor for connection to an AC line, a second conductor for connection to an AC neutral and a third conductor for connection to a ground, wherein the first, second and third conductors project from the housing;

(c) at least one female outlet disposed on the housing, the outlet comprising a first, a second, and a third conductor connected, respectively, to the first, the second and the third conductors of the AC plug;

(d) a ground-sensing circuit disposed within the housing and connected to the AC line, the AC neutral and the ground for determining whether or not the ground is present when the AC plug is inserted into an AC outlet; and (e) at least one external ground connection disposed on the housing and connected to the ground for providing the ground to an electrical device.

13. The grounding module of claim 12, further comprising:

a first light emitting diode (LED) for indicating the presence of the ground.

14. The grounding module of claim 12, further comprising:

a second LED for indicating the absence of the ground.

15. The grounding module according to claim 13 or 14, wherein the first and second LEDs indicate a wiring problem when they are simultaneously illuminated.

16. The grounding module of claim 12, wherein the ground-sensing circuit comprises: (1) a first resistor connected in series with the AC line; (2) a diode connected in series with the first resistor; (3) a capacitor, one side of the capacitor being connected to the AC line, the other being connected to the AC neutral; (4) a transistor including a base, an emitter, and a collector, the collector being connected to the AC neutral; (5) a first LED, one side of the LED being connected to the AC line, and the other side being connected to the base of the transistor; (6) a second resistor, one side being connected to the emitter of the transistor, the other being connected to the base of the transistor; (7) a third resistor, one side being connected to the base of the transistor, the other being connected to the ground; (8) a zener diode connected to the AC line; and (9) a second LED, one side being connected to the zener diode, and the other side being connected to the AC neutral.

17. The grounding module of claim 12, wherein the external ground connection comprises a screw for securing a grounding wire from an electrical device to the grounding module.

18. The grounding module of claim 12, further comprising:

an AC overvoltage protection circuit for protecting against overvoltage conditions appearing on the AC line.

19. The grounding module of claim 18, further comprising:

a third LED for indicating whether or not an AC overvoltage condition exists.

20. A grounding module, comprising:

(a) a housing;

(b) an AC plug, the plug having a first conductor for connection to an AC line, a second conductor for connection to an AC neutral and a third conductor for connection to a ground;

(c) at least one female outlet, the outlet comprising a first, a second, and a third conductor connected, respectively, to the first, the second and the third conductors of the AC plug;

(d) a ground/potential difference-sensing circuit disposed within the housing and connected to the AC line, the AC neutral and the ground for determining whether or not the ground is present and for determining whether or not there is a wiring problem in an AC outlet, when the AC plug is inserted into the AC outlet;

(e) at least one external ground connection connected to the ground for providing the ground to an electrical device; and (f) at least one coaxial connector connected to the ground for providing the ground to a device comprising a coaxial cable.

21. The grounding module of claim 20, further comprising:

a first LED for indicating the presence of the ground.

22. The grounding module of claim 20, further comprising:

a second LED for indicating the absence of the ground.

23. The grounding module according to claim 21 or 22, wherein the first and second LEDs indicate a wiring problem when they are simultaneously illuminated.

24. The grounding module of claim 20, further comprising:

a third LED for indicating the presence of a wiring problem in the AC outlet when a coaxial cable is connected to the coaxial connector.

25. The grounding module of claim 24, wherein the problem in the AC outlet results from reversed AC line and AC neutral wiring.

26. The grounding module of claim 20, wherein the coaxial connector is a female F-type coaxial connector.

27. The grounding module of claim 20, wherein the ground/potential difference-sensing circuit comprises: (1) a first resistor connected in series with the AC line; (2) a diode connected in series with the first resistor; (3) a capacitor, one side of the capacitor being connected to the AC line, the other being connected to the AC neutral; (4) a transistor including a base, an emitter, and a collector, the collector being connected to the AC neutral; (5) a first LED, one side of the LED being connected to the AC line, and the other side being connected to the base of the transistor; (6) a second resistor, one side being connected to the emitter of the transistor, the other being connected to the base of the transistor; (7) a third resistor, one side being connected to the base of the transistor, the other being connected to the ground; (8) a zener diode connected to the AC line; (9) a second LED, one side being connected to the zener diode, and the other side being connected to the AC neutral; (10) a fourth resistor connected in series with the ground; (11) a third LED connected to the coaxial connector; and (12) a third diode, one side being connected to the fourth resistor, and the other side being connected to the third LED.

28. The grounding module of claim 20, wherein the external ground connection comprises a screw for securing a grounding wire from an electrical device to the grounding module.

29. The grounding module of claim 20, wherein the external ground connection comprises a nut, clamp, latch or the like for securing a grounding wire from an electrical device to the grounding module.

30. The grounding module of claim 20, further comprising:

an AC overvoltage protection circuit for protecting against overvoltage conditions appearing on the AC line.

31. The grounding module of claim 30, further comprising:

a fourth LED for indicating whether or not an AC overvoltage condition exists.

32. The grounding module according to claim 20, wherein the AC plug is disposed within the housing.

33. The grounding module according to claim 20, wherein the AC plug is connected to the grounding module via a power chord.

34. A grounding module, comprising:

(a) a housing;

(b) an AC plug disposed within the housing, the plug having a first conductor for connection to an AC line, a second conductor for connection to an AC neutral and a third conductor for connection to a ground, wherein the first, second and third conductors project from the housing;

(c) at least one female outlet disposed on the housing, the outlet comprising a first, a second, and a third conductor connected, respectively, to the first, the second and the third conductors of the AC plug;

(d) a ground/potential difference-sensing circuit disposed within the housing and connected to the AC line, the AC neutral and the ground for determining whether or not the ground is present and for determining whether or not there is a wiring problem in an AC outlet, when the AC plug is inserted into the AC outlet;

(e) at least one external ground connection disposed on the housing and connected to the ground for providing the ground to an electrical device; and (f) at least one coaxial connector disposed on the housing and connected to the ground for providing the ground to a device comprising a coaxial cable.

35. A grounding module, comprising:

a first housing connected to a second housing via a power chord, the power chord comprising a means for connecting to an AC line, an AC neutral and a ground of the first housing and the second housing;

the first housing, comprising:

an AC plug, the plug having a first conductor for connection to an AC line, a second conductor for connection to an AC neutral and a third conductor for connection to a ground;

a ground-sensing circuit disposed within the first housing and connected to the AC line, the AC neutral and the ground for determining whether or not the ground is present when the AC plug is inserted into an AC outlet; and at least one external ground connection connected to the ground for providing the ground to an electrical device;

the second housing, comprising:

at least one female outlet, the outlet comprising a first, a second, and a third conductor connected, respectively, to the first, the second and the third conductors of the AC plug via the power chord; and at least one external ground connection connected to the ground for providing the ground to an electrical device.

36. The first housing of claim 35, further comprising:

at least one female outlet, the outlet comprising a first, a second, and a third conductor connected, respectively, to the first, the second and the third conductors of the AC plug.

37. The second housing of claim 35, further comprising:

a ground-sensing circuit disposed within the second housing and connected to the AC line, the AC neutral and the ground for determining whether or not the ground is present when the AC plug is inserted into an AC outlet.

38. The first housing of claim 35, further comprising:

a first LED for indicating the presence of the ground.

39. The first housing of claim 35, further comprising:

a second LED for indicating the absence of the ground.

* * * * *